(12) United States Patent
Linne et al.

(10) Patent No.: US 7,699,952 B2
(45) Date of Patent: Apr. 20, 2010

(54) METHOD AND DEVICE FOR POSITIONING BEAD WIRES

(75) Inventors: Stefan Linne, Wedemark (DE); Karl-Heinz Pawlik, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 577 days.

(21) Appl. No.: 11/569,771

(22) PCT Filed: May 24, 2005

(86) PCT No.: PCT/EP2005/052356

§ 371 (c)(1),
(2), (4) Date: Nov. 29, 2006

(87) PCT Pub. No.: WO2006/003057

PCT Pub. Date: Jan. 12, 2006

(65) Prior Publication Data

US 2008/0190548 A1 Aug. 14, 2008

(30) Foreign Application Priority Data

Jul. 6, 2004 (DE) ........................ 10 2004 032 511

(51) Int. Cl.
*B29D 30/32* (2006.01)
(52) U.S. Cl. ................... 156/131; 156/401; 156/403
(58) Field of Classification Search ............... 156/131, 156/132, 401, 403, 406.2
See application file for complete search history.

(56) References Cited

U.S. PATENT DOCUMENTS

| | | | | |
|---|---|---|---|---|
| 3,171,769 A | * | 3/1965 | Henley et al. | ............... 156/132 |
| 3,950,212 A | * | 4/1976 | Bullmann | ............... 156/398 |
| 4,685,992 A | * | 8/1987 | Irie | ............... 156/396 |
| 4,726,861 A | * | 2/1988 | Vorih et al. | ............... 156/131 |
| 6,352,602 B1 | | 3/2002 | Ogawa | |

FOREIGN PATENT DOCUMENTS

| | | | |
|---|---|---|---|
| DE | 1180515 | 10/1964 | |
| DE | 4223584 | 8/1993 | |
| EP | 303197 A2 * | 2/1989 | |
| EP | 376405 A1 * | 7/1990 | ............... 156/398 |
| EP | 0433920 | 6/1991 | |
| EP | 0995584 | 4/2000 | |
| EP | 1295708 | 3/2003 | |
| FR | 2043295 | 2/1971 | |
| WO | WO-03/055668 A1 * | 7/2003 | |

\* cited by examiner

*Primary Examiner*—Geoffrey L Knable
(74) *Attorney, Agent, or Firm*—Greenblum & Bernstein, P.L.C.

(57) ABSTRACT

Method and apparatus for positioning bead cores during a building of a radial tire carcass in a tire-building machine. The method includes positioning first and second bead cores on respective first and second core-centering devices, on a first side of a carcass drum and centering the first and second bead cores. Further, the method includes grasping, with a second core-setting device, the second bead core and transporting the second core-setting device and the second bead core to a second side of the carcass drum. Additionally, the method includes grasping, with a first core-setting device, the first bead core; and setting the first and second bead cores onto the tire carcass by the first and second core-setting devices.

7 Claims, 3 Drawing Sheets

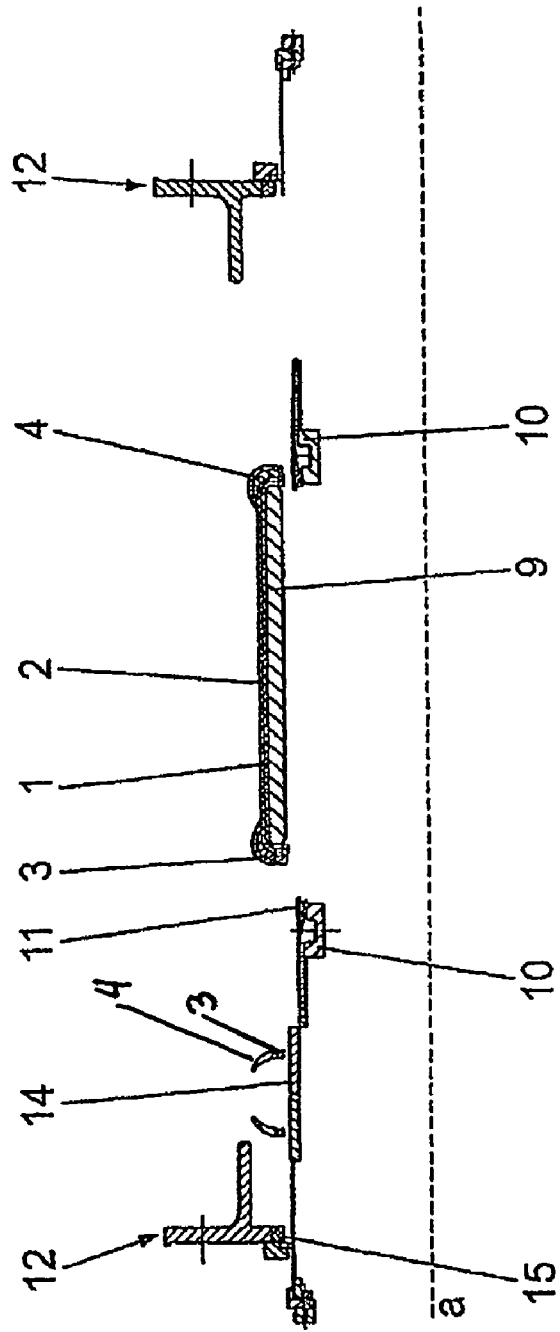
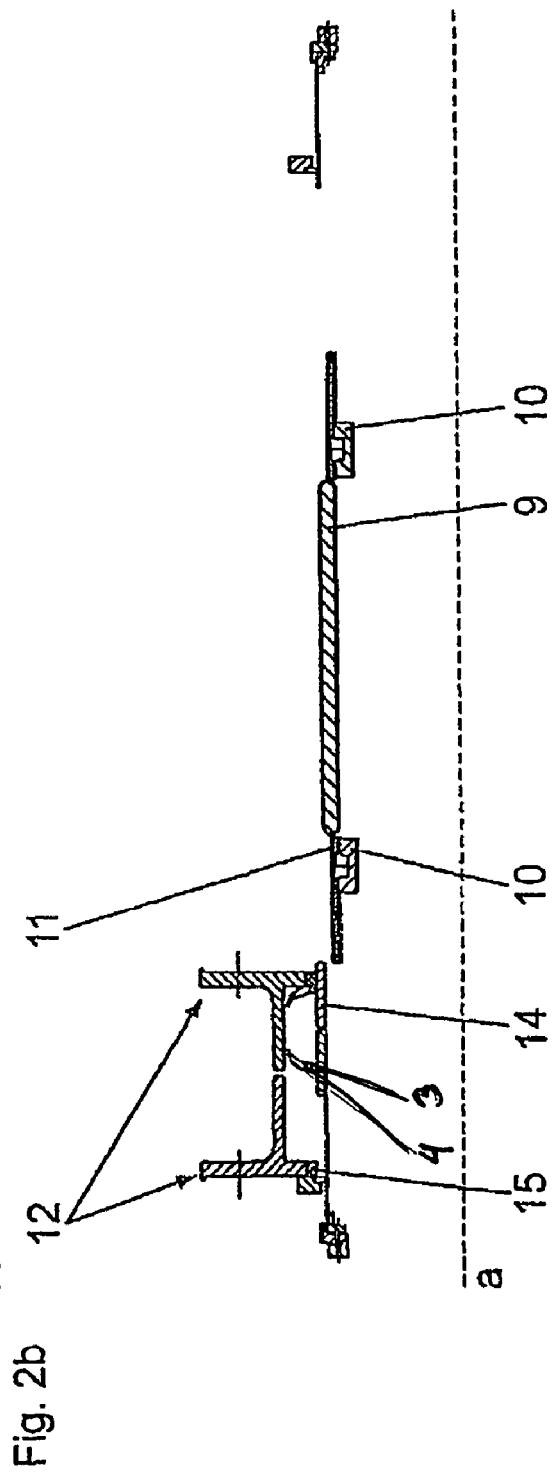
Fig. 2a
Fig. 2b

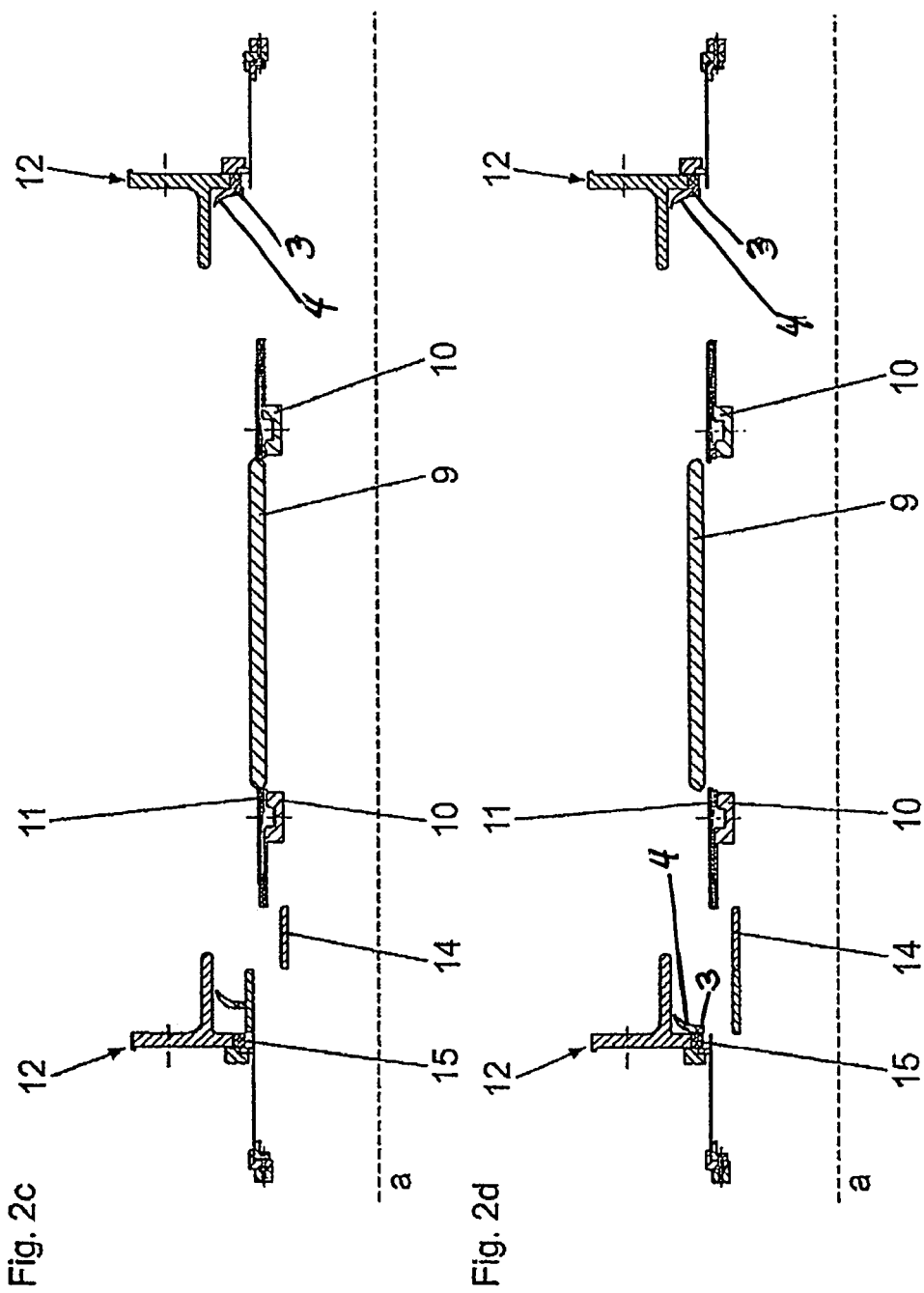

METHOD AND DEVICE FOR POSITIONING BEAD WIRES

CROSS REFERENCE TO RELATED APPLICATIONS

The present application is a U.S. National Stage Application of International Application No. PCT/EP2005/052356 filed May 24, 2005, which published as WO 2006/003057 A1 Jan. 12, 2006, the disclosure of which is expressly incorporated by reference herein in its entirety. Further, the present application claims priority under 35 U.S.C. §119 and §365 of German Application No. 10 2004 032 511.1 filed Jul. 6, 2004.

BACKGROUND OF THE INVENTION

1. Field of the Invention

The invention relates to a method for positioning bead cores during the building of a tire carcass of a radial tire on the first step of a tire-building machine which has an expandable carcass drum featuring a cylindrical outer circumference, two bellows supports with bellows and two core-setting devices displaceable in the axial direction of the carcass drum, whereby the core-setting devices pick up the cores from one of the sides of the carcass drum and one of the core-setting devices transports the core picked up by it to the other side of the carcass drum.

The invention further relates to a device for positioning bead cores during the building of a tire carcass of a radial tire on the first step of a tire-building machine which has an expandable carcass drum featuring a cylindrical outer circumference, two bellows supports with inflatable bellows and two core-setting devices displaceable in the axial direction of the carcass drum to pick up the cores from one side of the carcass drum, whereby one of the core-setting devices is displaceable over the carcass drum to the other side of the carcass drum.

2. Discussion of Background Information

It is known to produce green tires by one-step or two-step tire-building machines. In a two-step method, on the first step of the tire-building machine, the inner liner and subsequently the carcass ply is placed and spliced on an expandable carcass drum featuring a cylindrical outer circumference. With the drum expanded, the bead cores are set together with the core profiles. Then the projections of the carcass ply extending beyond the carcass drum are turned up around the bead cores and the core profiles, which is carried out with the aid of inflatable bellows. After the placing of further tire parts, if applicable, and the placing and rolling of sidewall profiles, the tire carcass is finished and is removed from the carcass drum now retracted. The tire carcass is transported to a second building drum via a transfer device. The belt layers are completed to form the belt assembly on a separate belt drum, and subsequently the one-piece or multi-piece tread rubber is applied. A transfer device transports the belt/tread rubber assembly to the tire carcass and positions it over the carcass. By shaping the tire carcass is joined together with the belt/tread rubber assembly and connected by rolling. In a one-step method the production of the carcass and the finishing of the green tire takes place on a single drum by completing with the belt/tread rubber assembly.

With two-step tire-building machines operating according to an expansion-drum method, the cores are set, e.g., from one side of the carcass drum in that the one core is blown over the carcass drum from left to right or vice versa with air nozzles. This measure is unpleasantly loud and works only insufficiently with cores with small core profiles. With tire-building machines operating according to the finger-ply-down method, there is no device at present that would facilitate or accelerate the setting of bead cores. The bead cores are placed into the tire-building machine left and right by hand. The cycle time of the tire-building machine is thus relatively long.

A method and a device for setting bead cores onto a tire carcass are known from EP-A2-1 295 708, in which a tire-building machine with a carcass drum is used, which is clamped on the one side so that both bead cores must be set from the free end of the drum. The two bead cores are grasped at the side of the free area of the carcass drum by one core-setting device each, whereby the one core-setting device is moved over the carcass drum in order to bring this bead core into a "parking position" on the carcass drum. As the core diameter is larger than the outer diameter of the drum, the core is first set onto holding parts arranged over the circumference of the carcass drum, and the core-setting device is removed. In order to set this core, the core-setting device grasps the core again and moves it onto the tire carcass built up in the meantime. When this core-setting device has been removed, it can be brought into its original position again on the other side of the carcass drum. To this ends it is provided that the core-setting device is assembled from segments which can open in a forcipate manner in order to be able to lift the device off the carcass drum.

SUMMARY OF THE INVENTION

The aim of the invention is to render possible an automatic setting of the bead cores, clearly reducing the cycle time, in the first step of a tire-building machine which has a carcass drum accessible from both sides and which operates in particular according to the finger-ply-down method or the expansion-drum method.

According to an aspect of the invention, cores are positioned on the one side of the carcass drum on annular core-centering devices arranged next to one another, with variable diameter, are held in a centered manner through an enlargement of the diameter of the core-centering devices, the bead core being closer to the carcass drum is grasped by the one core-setting device, is transported with it to the other side of the retracted carcass drum and remains in a waiting position during the building up of the tire carcass, the second core-setting device picks up the second core from the other core-centering device, and finally both cores are set onto the tire carcass by the core-setting devices.

According to another aspect of the invention, two annular core-centering devices with variable diameter and moveable in the axial direction of the carcass drum are provided on one side of the carcass drum.

According to the invention, the procedural steps of positioning and centering the cores and their pick-up by core-setting devices at the side of the carcass drum are thus carried out uncoupled from the carcass drum and in a largely automatic manner. The other building of the tire carcass can therefore take place in parallel to this, which shortens the machine cycle time and increases the degree of automation of the tire-building machine.

The machine cycle times are markedly reduced in that the positioning and centering of the cores takes place on the carcass drum during the finishing of a tire carcass already provided with other cores.

The production process proves to be particularly efficient if the positioning and centering of the cores is carried out during the placing and rolling of sidewall profiles.

It is also advantageous for a particularly efficient procedure if the core-setting device lying closer to the carcass drum is moved over the carcass drum together with the core immediately after the retraction of the carcass drum and the removal of a finished tire carcass. This core-setting device together with the core can remain here in a waiting position until the tire carcass has been built up sufficiently for the cores to be set.

The shaft on which the components of the tire-building machine are supported is preferably embodied in two parts, so that it is possible to move the core-centering devices together with the bellows supports adjacent to them and the core-setting device remaining on this side of the tire drum away from the carcass drum together. A clearance is thus produced between the carcass drum and the bellows support, which clearance makes it possible to bring the cores onto the core-centering devices and to remove the finished tire carcass from the carcass drum.

As already mentioned, the method according to the invention is characterized in that the procedural steps, which are otherwise carried out one after the other, can take place simultaneously. This also includes the fact that the core-setting device remaining on the one side of the carcass drum picks up the second core during the placing of the inner liner and the carcass ply.

BRIEF DESCRIPTION OF THE DRAWINGS

Further features, advantages and details of the invention are now described more closely on the basis of the diagrammatic drawing representing the exemplary embodiments.

FIGS. 2a-2d diagrammatically illustrates a basic structure and a basic functionality of a device according to the invention.

DETAILED DESCRIPTION OF THE INVENTION

Figure 1:
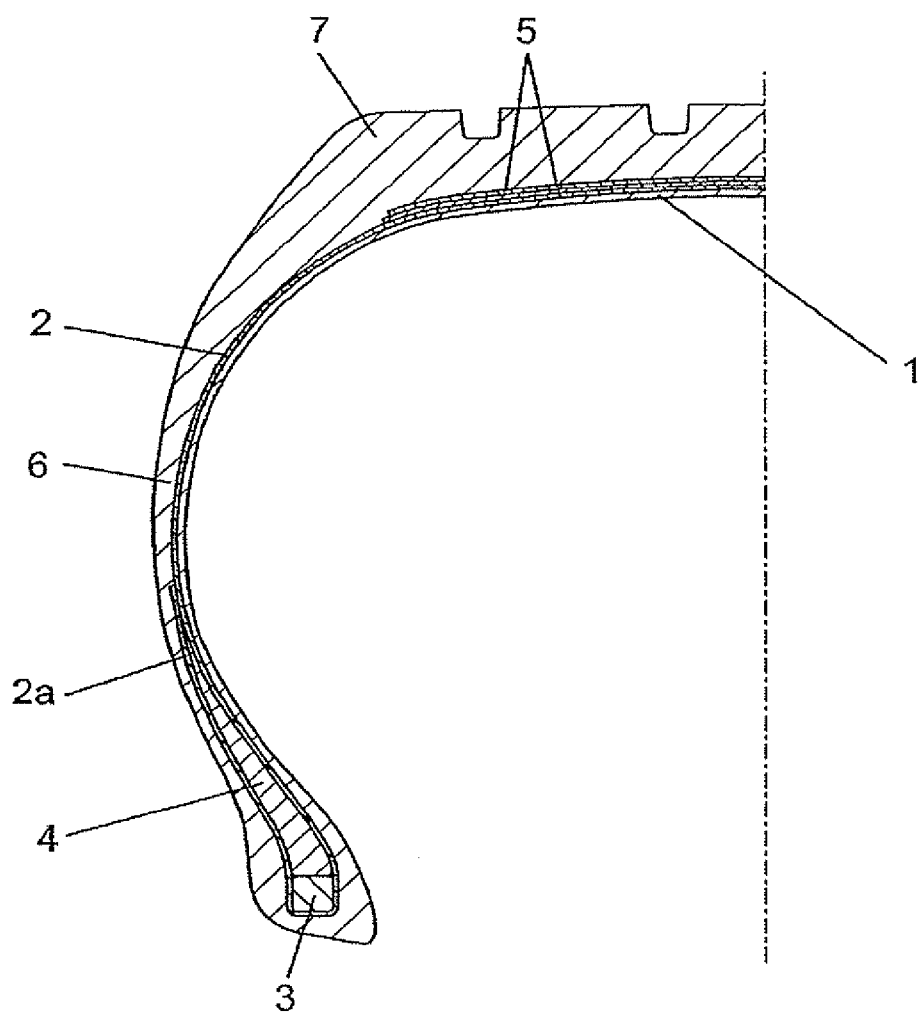
FIG. 1 illustrates a partial section through a radial tire.

The partial cross section, shown by way of example in FIG. 1, through a radial tire for automobiles represents and labels merely the main components of the tire. These include an airtight inner liner 1, a carcass ply 2, bead areas with bead cores 3 and core profiles 4, a belt comprising two belt layers 5, sidewalls 6 and a tread rubber 7. The carcass ply 2 of an automobile tire features strength supports customarily embedded in a rubber mixture, in particular textile strength supports, that run from bead area to bead area and the end sections of which are laid around the bead cores 3 from the inside outward and end in the sidewalls as turn-ups 2a. The carcass ply 2 can also be embodied in two layers. The bead cores 3 comprise a plurality of steel cables, the core profiles 4 resting on the bead cores 3 are customarily made of a relatively hard rubber mixture. In the production of the tire from its individual components the bead cores 3 are prefabricated as units together with the core profiles 4 as yet unvulcanized. These bead cores can additionally be provided with one or more layers of an outer cover of a rubberized fabric, so-called bead chafer strips.

The production of the tire takes place according to a two-step method or by a tire-building machine having two steps. The first step of the tire-building machine operates in particular according to the so-called finger-ply-down method or an expansion-drum method, and a tire carcass is produced or built that comprises at least the inner liner 1, the carcass ply 2, the cores 3, the core profiles 4 and the sidewalls 6. In the second step of the tire-building machine the tire components pertaining to the belt and to the tread rubber are completed. As already mentioned, the subject matter of the invention is the first step of the tire-building machine, the essential components of which are diagrammatically represented in the drawing FIGS. 2a through 2d.

In the drawing FIGS. 2a through 2d the dashed line a illustrates the central longitudinal axis of the tire-building machine, whereby in a complete representation the parts shown would be drawn as a mirror image to the line a. The components represented of the tire-building machine and also of the tire components are embodied or arranged at least essentially in a rotationally symmetric manner to the axis. The tire-building machine features an expandable carcass drum 9 having a cylindrical outer circumference and two bellows supports 10 for inflatable bellows 11. The first step of the tire-building machine represented further features two core-setting devices 12 which are provided over their circumference with a number of magnets 15 in a known manner. The two core-setting devices 12, embodied essentially in a rotationally symmetric manner to the longitudinal axis a, are arranged in a displaceable or moveable manner in the axial direction. As further components, the tire-building machine features two core-centering devices 14, which are rings divided in a manner not shown into segments over their circumference, such that their diameter can be reduced or enlarged concentrically by retracting or extending the segments. The core-centering devices 14 and the bellows support 10 adjacent to them are further displaceable or moveable in the axial direction, parallel to axis a. A shaft for the components represented is arranged along the axis a, which shaft is subdivided in the figures on the left of the carcass drum 9, so that the left bellows support 10, the two core-centering devices 14 and the left core-setting device 12 can be moved away from the carcass drum 9 together. A free space is thus produced next to the carcass drum 9, as shown in FIG. 2a. In this position a finished tire carcass can be removed from the carcass drum 9, and the cores 3 with the core profiles 4 can be brought onto the core-centering devices 14.

The mutual position and location represented in FIG. 2a of the individual components of the tire-building machine, together with a certain procedural step in the production of an automobile tire carcass is described first. An almost finished tire carcass is located on the expanded carcass drum 9, which tire carcass is composed at least of the inner liner 1, the carcass ply 2 and the cores 3 with core profiles 4. The one core-setting device 12 is located on the right of the carcass drum 9, the second one, located left of the carcass drum 9, has been moved away from the carcass drum 9 together with the core-centering devices 14 and the left bellows support 10. The bellows support 10 on the right of the carcass drum 9 is in its normal position. The two core-centering devices 14 are positioned next to one another between the left bellows support 10 and the core-setting device 12 located on the left and are in their retracted position. The two annular cores 3 with the core profiles 4 have been introduced as a unit by hand through the wide gap located between the carcass drum 9 and the left bellows support 10 and have been set onto the core-centering devices 14. During the positioning of the cores 3 and the subsequent centering by expanding the core-centering devices 14, the sidewall profiles (not shown here) are placed onto the tire carcass and rolled up by devices (not shown). Now the finished tire carcass is removed from the carcass drum 9 previously retracted. The two core-setting devices 12 are moved to the right together with the two expanded core-centering devices 14 and the bellows support 10 located on the left, until this bellows support 10 has assumed its normal position at the carcass drum 9. FIG. 2b shows this position of the components of the tire-building machine, whereby the right core-setting device 12 has already grasped the core 3 from the right of the two core-centering devices 14 in a magnetic manner. Now the segments of the right core-centering device 14 are retracted and the right core-setting device 12 is moved to the right into a waiting position together with the bead core 3 over the carcass drum 9 still retracted and the two bellows supports 10. At the same time the left core-setting device 12 has been brought into a waiting position opposite the left core-centering device 14, so that the left bead core 3 could be grasped by the magnets 15 of the device 12 through a slight axial movement of the core-setting device 12. This position of the individual parts of the tire-building machine is shown in FIG. 2c.

Now the next tire carcass can be built up by first placing and splicing the inner liner 1 and the carcass ply 2 onto the carcass drum 9 now expanded again. During the placing of the inner liner 1 and the carcass ply 2, the left core-setting device 12 takes the left core 3 from the core-centering device 14. Now both cores 3 are positioned in the core-setting devices 12. FIG. 2d shows this position during the tire building. Now the cores 3 can be set automatically by the core-setting devices 12 and the tire carcass can be built up further by forming the carcass turn-ups in a known manner by the inflatable bellows 11.

The device according to the invention and the method according to the invention are characterized by a very high degree of automation. Also the very short cycle time is of particular advantage, as the individual procedural steps can take place simultaneously. Furthermore, it is not necessary to use a carcass drum that has a closed cylindrical drum surface in the collapsed, not expanded state.

The invention claimed is:

1. A method for positioning bead cores during a building of a radial tire carcass in a tire-building machine, the method comprising:
    positioning first and second bead cores on respective first and second core-centering devices, on a first side of a carcass drum;
    centering the first and second bead cores;
    grasping, with a second core-setting device, the second bead core;
    transporting the second core-setting device and the second bead core to a second side of the carcass drum;
    grasping, with a first core-setting device, the first bead core;
    and setting the first and second bead cores onto the tire carcass in respective first and second bead core positions by the first and second core-setting devices,
    wherein the tire building machine comprises first and second bellows supports with bellows, and wherein:
        the first and second core-centering devices have variable diameters,
        the first and second core-setting devices are displaceable in an axial direction of the carcass drum, and
        the carcass drum comprises an expandable carcass drum with a cylindrical outer circumference,
    wherein the centering of the first and second bead cores occurs through enlargement of diameters of the first and second core-centering devices, and
    wherein the second core-setting device and the second bead core are transported to the second side of the carcass drum to a waiting position axially beyond the second bead core position during a building of the tire carcass, and
    the method further comprising moving the first core-setting device together with the core-centering devices and the first bellows support adjacent the first side of the carcass drum away from the carcass drum to provide a free space to allow the positioning of the first and second bead cores and removing a preceding tire carcass.

2. The method of claim 1, wherein the second bead core is grasped from the second core-centering device, positioned closer to the carcass drum.

3. The method according to claim 1, wherein the positioning and centering of the first and second bead cores occurs during a finishing of assembly of a preceding tire carcass already provided with other bead cores on the carcass drum.

4. The method according to claim 3, wherein the positioning and centering of the first and second bead cores is carried out during a placing and rolling of sidewall profiles of the preceding tire carcass.

5. The method according to claim 1, wherein the carcass drum is an expandable carcass drum, and the method further comprises retracting the expandable carcass drum and removing a preceding tire carcass, and the transporting further comprises moving the second core-setting device and the second bead core over the carcass drum immediately after the retraction and removal of the preceding tire carcass.

6. The method according to claim 1, wherein substantially concurrently with the grasping of the first bead core, the method further comprises placing an inner liner and a carcass ply.

7. A device for positioning first and second bead cores in respective first and second bead core positions on a radial tire carcass during the building of the radial tire carcass in a tire-building machine having an expandable carcass drum with a cylindrical outer circumference, the device comprising:
    first and second bellows supports with inflatable bellows and first and second core-setting devices displaceable in an axial direction of the carcass drum to pick up the bead cores from a first side of the carcass drum,
    two core-centering devices having variable diameters and moveable in the axial direction of the carcass drum structured and arranged to center the first and second bead cores through enlargement of the variable diameters of the first and second core-centering devices, wherein the second core-setting device is structured and arranged to be displaceable over the carcass drum while holding the second bead core during a building of the radial tire carcass to a second side of the carcass drum to a waiting position beyond the second bead core position,
    wherein the first core-setting device, the core-centering devices and the first bellows support adjacent the first side of the carcass drum are supported on a common shaft to be movable together in a direction parallel to a carcass drum axis and away from the carcass drum to provide a free space between the carcass drum and the first bellows support to allow positioning of the first and second bead cores on respective first and second core-centering devices and removing a preceding finished tire carcass from the carcass drum.

* * * * *